United States Patent
Shu et al.

(10) Patent No.: US 7,826,870 B2
(45) Date of Patent: *Nov. 2, 2010

(54) SEPARATING MIXED SIGNALS IN A CELLULAR ENVIRONMENT

(75) Inventors: David B. Shu, West Hills, CA (US); Yuri Owechko, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/381,442

(22) Filed: May 3, 2006

(65) Prior Publication Data

US 2007/0202919 A1    Aug. 30, 2007

Related U.S. Application Data

(63) Continuation-in-part of application No. 10/421,167, filed on Apr. 22, 2003, now Pat. No. 7,133,699.

(51) Int. Cl.
 *H04M 1/00* (2006.01)
 *H04K 3/00* (2006.01)
(52) U.S. Cl. .................. 455/562.1; 455/67.11; 704/203
(58) Field of Classification Search .............. 455/67.11, 455/67.13, 67.15, 562.1; 704/203, 205–206
See application file for complete search history.

(56) References Cited

U.S. PATENT DOCUMENTS

| | | | |
|---|---|---|---|
| 6,236,862 B1 | 5/2001 | Erten et al. | 455/501 |
| 6,424,960 B1 | 7/2002 | Lee et al. | 706/20 |
| 7,133,699 B1 * | 11/2006 | Owechko et al. | 455/562.1 |
| 2002/0176485 A1 | 11/2002 | Hudson | 375/144 |
| 2003/0061035 A1 | 3/2003 | Kadambe | 704/203 |
| 2004/0100897 A1 | 5/2004 | Shattil | 370/206 |
| 2006/0094373 A1 | 5/2006 | Hottinen | 455/73 |

FOREIGN PATENT DOCUMENTS

| | | |
|---|---|---|
| EP | 1 482 659 A2 | 12/2004 |
| WO | WO 98/10537 | 3/1998 |
| WO | WO 01/89167 | 11/2001 |

OTHER PUBLICATIONS

Notification of Transmittal of the International Search Report or the Declaration (PCT Rule 44.1) mailed Sep. 29, 2004 (13 pages) re International Application No. PCT/US2004/008948, Mar. 23, 2004.
Lloyd J. Mason, "Detection of Digital Signals with Antenna Arrays Using Estimation," 1994 Canadian Conference on Electrical and Computer Engineering, Conference Proceedings, (Cat. No. 94TH8023), IEEE New York, New York, vol. 1, pp. 380-383, XP00229623, ISBN: 0-7803-2416-1, Sep. 25, 1994.

(Continued)

*Primary Examiner*—Lee Nguyen
(74) *Attorney, Agent, or Firm*—Baker Botts L.L.P.

(57) ABSTRACT

Separating mixed signals includes receiving the mixed signals from signal sources transmitting from a number of cells. A signal source is operable to transmit a source signal, and a mixed signal comprises at least a subset of the source signals. A complex mixing matrix is established from the mixed signals. The complex mixing matrix describes mixing the source signals to yield the mixed signals. The number of cells is estimated from the mixed signals. The mixed signals are separated using the complex mixing matrix and the estimated number of cells.

20 Claims, 7 Drawing Sheets

OTHER PUBLICATIONS

U.S. Appl. No. 10/421,167 entitled, "*System and Method for Separating Signals Received by an Overloaded Antenna Array*", 25 pages specification, claims and abstract, 5 pages of drawings, inventors Yuri (nmi) Owechko et al, filed Apr. 22, 2003.

PCT Notification of Transmittal of the International Search Report and the Written Opinion of the International Searching Authority, or the Declaration with attached PCT International Search Report and Written Opinion of the International Searching Authority in International Application No. PCT/US 2007/010529, dated Jan. 30, 2008, 13 pages.

* cited by examiner

SEPARATING MIXED SIGNALS IN A CELLULAR ENVIRONMENT

CROSS REFERENCE TO RELATED APPLICATIONS

This application is a continuation-in-part of U.S. application Ser. No. 10/421,167, filed 22 Apr. 2003 by Yuri (nmi) Owechko et al. now U.S. Pat. No. 7,133,699 and entitled "System And Method For Separating Signals Received By An Overloaded Antenna Array".

TECHNICAL FIELD

This invention relates generally to the field of wireless communications and more specifically to a method and system for separating mixed signals in a cellular environment.

BACKGROUND

In certain environments, there may be many signal sources, such as mobile phones and personal digital assistants, that wirelessly transmit signals that combine to form mixed signals. An antenna array that receives the mixed signals separates the signals according to the sources. In overloaded antenna array cases, the number of signal sources exceeds the number of antenna elements of the array, which may complicate signal separation.

Current techniques that attempt to separate mixed signals in an overloaded case are limited in that they handle complex signals, such as multi-path signals. In addition, such techniques are useful only with very small antenna arrays, such as arrays consisting of two elements. Moreover, such techniques typically require calibrated antenna arrays. Furthermore, such techniques often require prior knowledge of the particular signals within the wireless environment. In addition, such techniques often require prior knowledge of the number of cells within the wireless environment.

SUMMARY OF THE DISCLOSURE

In accordance with the present invention, disadvantages and problems associated with previous techniques for separating mixed signals may be reduced or eliminated.

According to one embodiment of the present invention, separating mixed signals includes receiving the mixed signals from signal sources transmitting from a number of cells. A signal source is operable to transmit a source signal, and a mixed signal comprises at least a subset of the source signals. A complex mixing matrix is established from the mixed signals. The complex mixing matrix describes mixing the source signals to yield the mixed signals. The number of cells is estimated from the mixed signals. The mixed signals are separated using the complex mixing matrix and the estimated number of cells.

Certain embodiments of the invention may provide one or more technical advantages. A technical advantage of one embodiment may be that the number of cells is estimated to separate mixed signals. The estimated number of cells may be used to limit the search space for finding the shortest path that sparsely represents a signal. Limiting the search space may allow for efficient signal separation. Another technical advantage of one embodiment may be that cell frame boundaries are established to estimate the number of cells. Establishing the cell frame boundaries may allow for effective cell number estimation.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 11 of the drawings, like numerals being used for like and corresponding parts of the various drawings.

Figure 1:
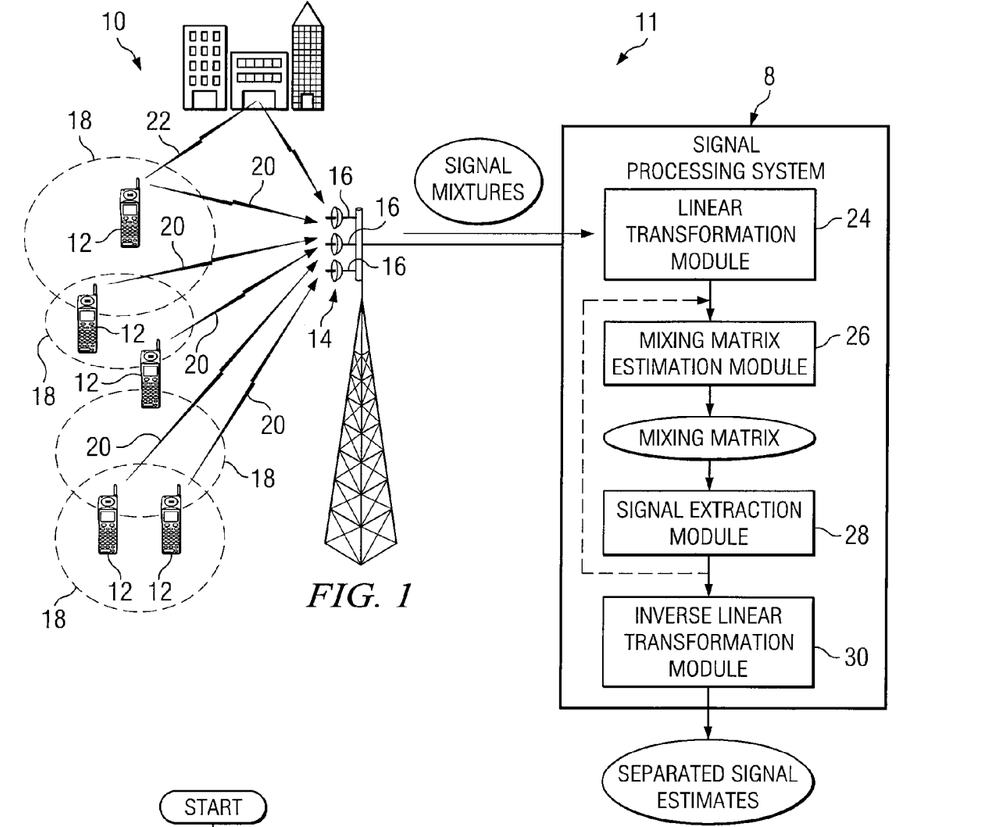
FIG. 1 includes a block diagram illustrating one embodiment of a wireless communication system operable to separate mixed signals into source signals.

FIG. 1 includes a block diagram illustrating one embodiment of a wireless communication system 10. According to the embodiment, system 10 may include a signal processing system 8 operable to separate mixed signals. Signal processing system 8 may estimate the number of cells to separate mixed signals. The estimated number of cells may be used to limit the search space for finding the shortest path that sparsely represents a signal. Limiting the search space may allow for efficient signal separation. Signal processing system 8 may establish cell frame boundaries to estimate the number of cells.

According to one embodiment, signal processing system 8 may use a magnitude clustering and phase difference technique to establish cell frame boundaries and to estimate the number of cells. A magnitude clustering and phase difference technique may generally include establishing magnitude vectors about which data points cluster, and calculating phase differences for the magnitude vectors.

System 10 includes components such as devices. In general, a device may include any suitable arrangement of components operable to perform the operations of the device, and may comprise logic such as hardware, software, other logic, or any suitable combination of the preceding. As an example, one or more components of system 10 may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, communication system 10 includes a plurality of wireless signal sources 12 communicating with an antenna system 11 from a plurality of cells 18. A cell represents a geographic unit of a network attachment point of a communication network. As an example, cell 18 may represent a cell of a cellular network. A signal source 12 comprises any suitable device operable to wirelessly transmit a source signal. Signal source 12 may comprise, for example, a personal digital assistant, a computer such as a laptop, a cellular telephone, a mobile handset, or any other device operable to wirelessly transmit a source signal.

Antenna system 11 includes an array 14 of antenna elements 16 and signal processing system 8. Antenna system 11 and signal processing system 8 may cooperate to receive and/or transmit signals in a spatially sensitive manner. For example, antenna system 11 may be operable to determine the direction of arrival of uplink signals communicated from each wireless signal source 12 and select particular directions to transmit downlink signals to the wireless signal sources 12.

Antenna elements 16 may be physically spaced apart in a particular pattern. For example, elements 16 may be spaced apart at equal distances. Each antenna element 16 may be operable to receive signals from and/or transmit signals to wireless signal sources 12.

An antenna element 16 may receive a mixed signal that includes a combination of the signals communicated from at least some signal sources 12. A source signal received from a particular signal source 12 may be a composite, or complex, signal due to the effects of inter-symbol interference, such as the multi-path effect. For example, a complex signal from signal source 12a may include signals received along direct path 20 as well as signals received along reflected path 22.

Signal processing system 8 is operable to separate the mixed signals received by antenna elements 16 of array 14 into the source signals communicated by each signal source 12, and to estimate the spatial direction of each source signal. In particular embodiments, signal processing system 8 is operable to separate mixed signals that include complex signals received from various signal sources 12.

In particular embodiments, signal processing system 8 may be operable to separate mixed signals received by antenna elements 16 when array 14 is overloaded, as well as when array 14 is not overloaded. Array 14 may be said to be overloaded if one or more of the following conditions is present. According to a first condition, the number N of source signals exceeds the number M of antenna elements 16. According to a second condition, the number C of cells is greater than or equal to the number M of antenna elements 16, that is, $C \geq M$ and $N > 2C$, which may give rise to overloaded cellular TDMA signal mixtures.

In particular embodiments, signal processing system 8 may be operable to use sparsity as an additional constraint for separating mixed signals received by an overloaded array 14. "Sparse" signals may refer to signals that have a larger proportion of zero values or low values than would be expected for signals having a Gaussian probability distribution. For example, various types of source signals (such as music, speech, and other communication signals) can be assumed to achieve "sparsity" in the frequency domain.

In particular embodiments, signal processing system 8 may be operable to estimate the number of cells to separate mixed signals. The estimated number of cells may be used to limit the search space for finding the shortest path that sparsely represents a signal. Signal processing system 8 may establish cell frame boundaries to estimate the number of cells. A magnitude clustering and phase-difference technique may be used to establish cell frame boundaries and to estimate the number of cells.

According to the illustrated embodiment, signal processing system 8 may include a linear transform module 24, a mixing matrix estimation module 26, a signal extraction module 28, and an inverse linear transform module 30. Linear transform module 24 is operable to transform received signals from the time domain into the frequency domain. Any suitable transform may be used, for example, a short-time Fourier transform (STFT) or wavelets transform.

Mixing matrix estimation module 26 is operable to estimate the values for a complex mixing matrix. A mixing matrix may refer to an M×N matrix that includes mixing coefficients that describe the mixing of the source signals that corresponds to the mixed signals. Signal extraction module 28 is operable to separate the mixed signals received by array 14 into the various source signals using the estimated complex mixing matrix. For example, signal extraction module 28 may use a magnitude clustering and phase-difference technique to establish cell frame boundaries and to estimate the number of cells. Inverse linear transform module 30 is operable to transform the separated source signals back to the time domain.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of mixing matrix estimation module 26 and signal extraction module 28 may be performed by one module, or the operations of signal extraction module 28 may be performed by more than one module. Additionally, operations of system 10 may be performed using any suitable logic. As used in this document, "each" refers to each member of a set or each member of a subset of a set.

Figure 2:
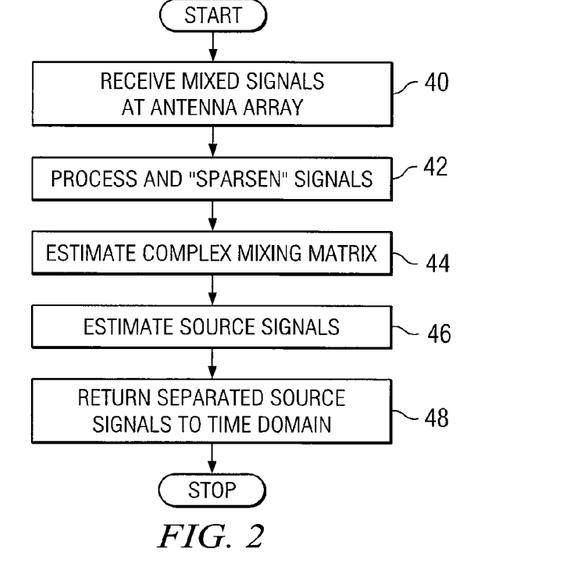
FIG. 2 includes a flowchart illustrating one embodiment of a method for separating mixed signals into source signals.

FIG. 2 includes a flowchart illustrating one embodiment of a method for separating mixed signals into source signals. According to the embodiment, an array of M antenna elements receives N signals from C cells. Each cell has L TDMA time slots, where N=CL and C≧M. Each cell $C_i$ has a unique cell frame boundary $B_i$, and the array has a reference frame boundary $B_r$.

Blind source separation (BSS) may be performed by solving Equation (1) for antenna element output matrix X:

$$X = A*S + V \quad (1)$$

where A represents a mixing matrix, S represents a source signal matrix, and V represents a noise matrix. Mixing matrix A and source signals S may be unknown.

According to one embodiment, antenna element output matrix X may be an M×T matrix that corresponds to the output of M antenna elements at successive times, t=1, 2, ..., T. That is, row $X_i$ corresponds to the $i^{th}$ mixed signal. Source signal matrix S may be an N×T of underlying source signals. Noise matrix V may be a M×T matrix. Mixing matrix A may be a M×N mixing matrix includes mixing coefficients that describe mixing source signals to yield mixed signals.

Mixing matrix A may be decomposed into columns $a^j$ and particularized for every data point to yield Equation (2):

$$x^t = \sum_{j=1}^{N} a^j s_j^t, \text{ for } t = 1, 2, \ldots, T \quad (2)$$

where $x^t$ represents an M-dimensional column vector corresponding to the output of M antenna elements at a given discrete time instant t, and $s_j^t$ represents the signals for column j at time t.

The method begins at step 40, where mixed signals are received. According to the embodiment, M antenna elements 16 receives N signals 12 from C cells 18. In one example, N=5, and M=3. The mixed signals are processed and sparsened at step 42 using linear transforms.

Certain types of source signals (such as music, speech, and other communication signals) may exhibit a near-Laplacian distribution in the frequency domain, and may be assumed to be sparse. "Sparse" signals may refer to signals that have only a small number of coefficients $s_i$ in the transform domain that differ significantly from zero. "Sparsity" may refer to situations in which the signals are sparse. "Sparsening" may refer to increasing the number of sparse signals. Under a near-Laplacian distribution, the $l_1$ norm $\Sigma_{jt}|s_j^t|$ of the components may be minimized, which may maximize the number of coefficients $s_i$, i=1, 2, ... n, that are zero or close to zero. The number may be greater than would be expected for signals having a Gaussian probability distribution.

Assuming sparsity, Equation (1) may be formulated in mixture space rather than source space. A maximum a posteriori log-probability analysis yields Equation (3):

$$\min_{A,S} \frac{1}{2\sigma^2} \|AS - X\|^2 + \sum_{jt} |s_j^t| \quad (3)$$

where $\sigma^2$ represents the variance of the noise V. The first term corresponds to the sum of the squares of the error, and the second term optimizes the sparsity of the recovered sources in the $l_1$ norm sense. Allowing only one signal per cell limits the search space for finding the shortest path that sparsely represents the signal.

Complex mixing matrix A is estimated at step 44. Matrix A may be estimated using magnitude clustering and phase difference determination, and executing a shortest-path closed-form QR enclosing solution to obtain a sparse representation of the source signals S. Generally, magnitude clustering includes creating a scatter plot of data points representing mixed signals received during time duration T, and determining from the scatter plot the directions of maximum data density corresponding with each source signal. Phase difference determination generally includes generating a mixture phase difference histogram for a set of data points associated with each source signal, and finding the peak of each histogram.

Source signals S are estimated at step 46. Source signals S may be estimated using a shortest path algorithm with QR factorization. With reduced search space, the source signals for a noisy case may be found independently for each data point $x^t$, leading to T tractable small problems according to Equation (4):

$$\min_{S^t} \frac{1}{2\sigma^2} \|As^t - x^t\|^2 + \sum_j |s_j^t|, \text{ for } t = 1, 2, \ldots, T \quad (4)$$

In the absence of noise, Equation (5) may be used:

$$\min_{S^t} = \sum_j |s_j^t|, \text{ subject to } As^t = x^t, \text{ for } t = 1, 2, \ldots, T \quad (5)$$

An inverse linear transform function is performed at step 48 to return the separated source signals to the time domain. After returning the separated source signals to the time domain, the method ends.

Modifications, additions, or omissions may be made to the method without departing from the scope of the invention. The method may include more, fewer, or other steps. Additionally, steps may be performed in any suitable order without departing from the scope of the invention.

Figure 3:
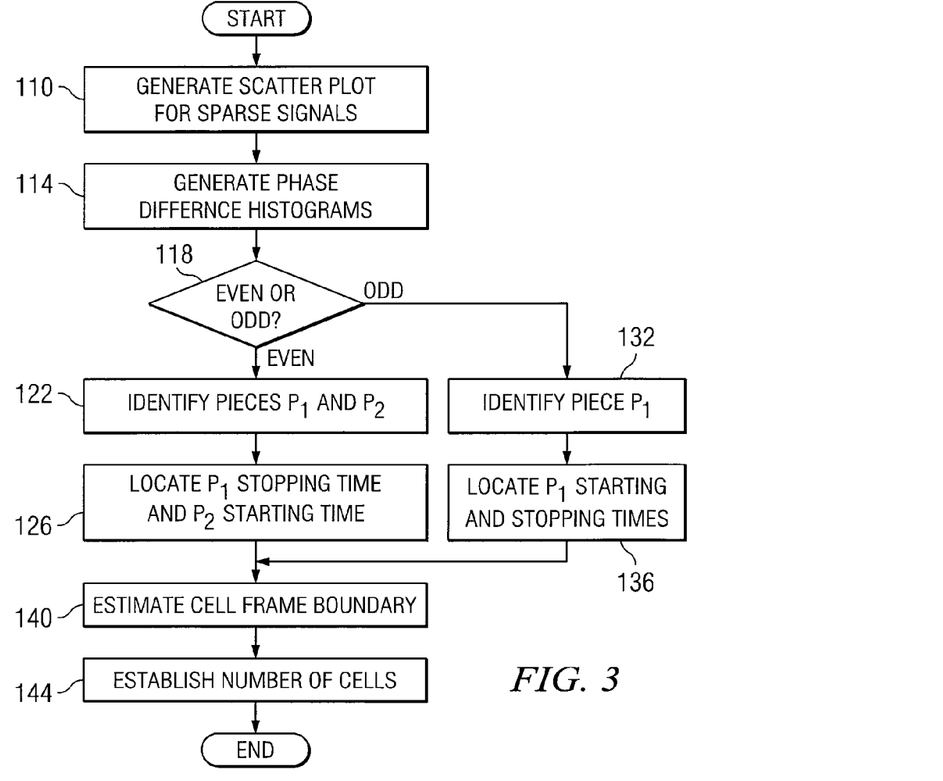
FIG. 3 includes a flowchart illustrating one embodiment of a method for estimating the number of cells associated with received mixed signals.

FIG. 3 includes a flowchart illustrating one embodiment of a method for estimating the number of cells associated with received mixed signals. According to the embodiment, modulo starting and stopping times of each time slot are estimated using a magnitude clustering and phase difference technique. Cell frame boundaries are established in accordance with the modulo starting and stopping times. The number of cells is estimated from the cell frame boundaries using a magnitude clustering and phase difference technique.

A scatter plot for sparse signals is generated at step 110. In general, the data points form elongated clusters defining a number N of M-dimensional magnitude vectors corresponding to the columns of the mixing matrix. The scatter plot may be generated by plotting the frequency domain values of a mixed signal received by an antenna element versus the frequency domain values of mixed signals received by other antenna elements.

Figure 4:
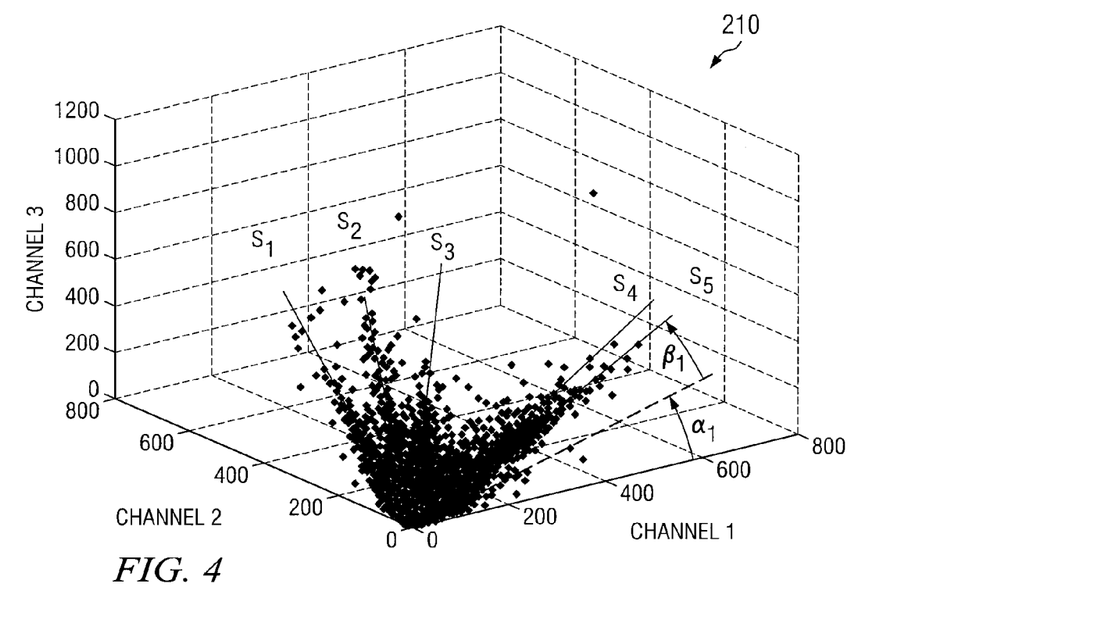
FIG. 4 includes a magnitude scatter plot in Cartesian coordinates of a set of example mixture data points representing mixed signals.

FIG. 4 includes a magnitude scatter plot 210 in Cartesian coordinates of a set of example data points representing mixed signals. In the example, N=5, and M=3. Scatter plot 210 may be generated by plotting the frequency domain values of mixed signal $x_1$ received by Channel 1 versus the frequency domain values of mixed signals $x_2$ and $x_3$ received by Channels 2 and 3, respectively. The magnitude vector lines labeled as $s_1$, $s_2$, $s_3$, $s_4$, and $s_5$ represent the actual, or true, source directions associated with five signal sources 12. The actual source directions are shown for illustrative purposes only, and remain unknown to signal processing system 8.

For a certain group of data points, sufficient sparsity may cause sources $s_2$, $s_3$, $s_4$, and $s_5$ to approach or equal zero, leaving source $s_1$ as the only significant source. As a result, this group of data points significantly clusters around the magnitude vector associated with source $s_1$. Similarly, for another group of data points, source $s_2$ remains as the only significant source, and such data points significantly cluster around the magnitude vector associated with source $S_2$, and so on for sources $s_3$, $s_4$, and $s_5$.

Equation (1) may be used to analyze the scatter plots. Where C=4, L=2, M=3 and N=CL=8, Equation (1) may be expanded as follows:

$$\begin{bmatrix} x_1 e^{jw_{x1}} \\ x_2 e^{jw_{x2}} \\ x_3 e^{jw_{x3}} \end{bmatrix} = \begin{bmatrix} a_{11} e^{jw_{11}} & a_{12} e^{jw_{12}} & \cdots & a_{15} e^{jw_{18}} \\ a_{21} e^{jw_{21}} & a_{22} e^{jw_{22}} & \cdots & a_{25} e^{jw_{28}} \\ a_{31} e^{jw_{31}} & a_{32} e^{jw_{32}} & \cdots & a_{35} e^{jw_{38}} \end{bmatrix} \begin{bmatrix} s_1 e^{jw_{s1}} \\ s_2 e^{jw_{s2}} \\ \cdots \\ s_5 e^{jw_{s8}} \end{bmatrix} \quad (6)$$

where the left hand side of the equation represents a particular M-dimensional mixture data point vector, j represents the imaginary or complex element, and w represents the phase.

For the group of data points associated with source $s_1$, Equation (6) may be approximated as:

$$x_1 e^{jw_{x1}} = a_{11} s_1 e^{j(w_{11}+w_{s1})} \quad (7)$$
$$x_2 e^{jw_{x2}} = a_{21} s_1 e^{j(w_{21}+w_{s1})}$$
$$x_3 e^{jw_{x3}} = a_{31} s_1 e^{j(w_{31}+w_{s1})}$$

Further, taking the magnitude of Equation (7) yields:

$$\begin{bmatrix} |x_1| \\ |x_2| \\ |x_3| \end{bmatrix} = \begin{bmatrix} |a_{11}| \\ |a_{21}| \\ |a_{31}| \end{bmatrix} s_1 \quad (8)$$

where $|x_1|$, $|x_2|$, and $|x_3|$ are the known magnitudes of each data point, and are equivalent to the product of the unknown magnitude vector $[|a_{11}| \, |a_{21}| \, |a_{31}|]$ of the mixing matrix A times the value of a single source $s_1$.

Referring back to FIG. 3, phase difference histograms for each group of data points are generated at step 114. A phase difference histogram may be generated for each magnitude vector of a source signal. The peak of a phase difference histogram corresponds to the estimated phase difference for a given magnitude vector. If data points derived from a particular signal have phase differences in small neighborhoods of corresponding peaks, the modulo time indices associated with these data points may be used to estimate the modulo starting and stopping times of the signal.

Data points substantially cluster around magnitude vectors, but they differ in source signal magnitude. Due to phase ambiguity, a given data point provides unambiguous information only about differences between the phase values of the complex mixture $x_i$, where $1<i\leq M$. Thus, there are M−1 cases of phase difference values for a given data point $x^t$.

The phase difference between the individual rows of Equation (7) may be determined from Equations (9a) and (9b) to yield Equations (10a) and (10b) for $s_1$:

$$\frac{X_2 e^{jw_{x2}}}{X_1 e^{jw_{x1}}} = \frac{a_{21} s_1 e^{j(w_{21}+w_{s1})}}{a_{11} s_1 e^{j(w_{11}+w_{s1})}} \quad (9a)$$

$$\frac{X_3 e^{jw_{x3}}}{X_1 e^{jw_{x1}}} = \frac{a_{31} s_1 e^{j(w_{31}+w_{s1})}}{a_{11} s_1 e^{j(w_{11}+w_{s1})}} \quad (9b)$$

$$w_{X2} - w_{X1} = (w_{21}+w_{s1}) - (w_{11}+w_{s1}) = w_{21} - w_{11} \quad (10a)$$

$$w_{X3} - w_{X1} = (w_{31}+w_{s1}) - (w_{11}+w_{s1}) = w_{31} - w_{11} \quad (10b)$$

where Equation (10a) represents the phase difference between the first and second rows of Equation (7), and Equation (10b) represents the phase difference between the second and third rows of Equation (7). Equations (10a) and (10b) may be solved to yield phase difference histograms for source $s_1$. A phase difference histogram may be generated by applying Equation (10a) to the set of data points selected for source $s_1$. Phase difference histograms may be similarly generated for sources $s_2$ through $s_5$.

According to one embodiment, certain data points may be selected to generate a phase difference histogram. As an example, data points that form a magnitude vector that makes a very small angle, such as less than a given threshold angle, with the corresponding magnitude vector of matrix A may be selected.

Figure 5:
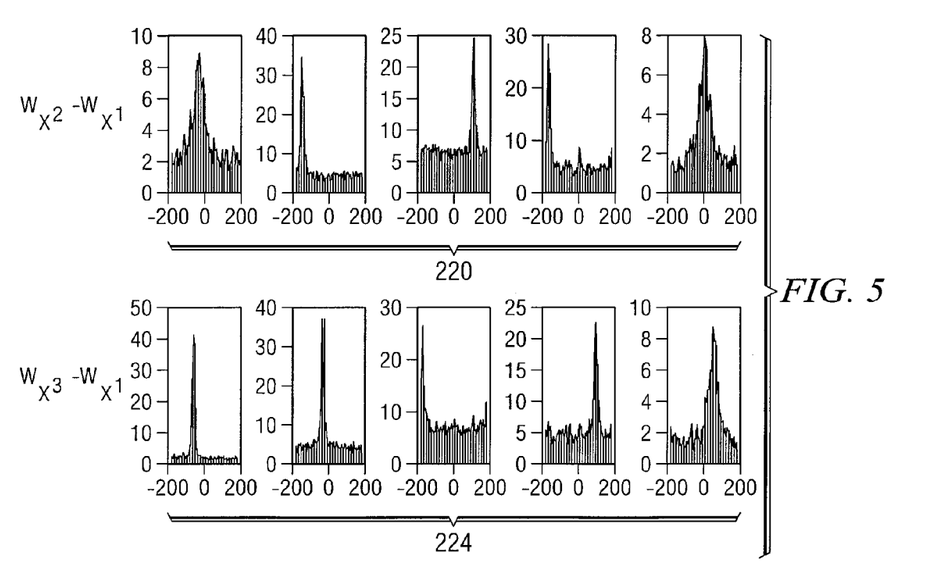
FIG. 5 includes diagrams illustrating example phase difference histograms of data points associated with corresponding magnitude vectors.

FIG. 5 includes diagrams 220 and 224 illustrating example phase difference histograms of data points associated with corresponding magnitude vectors. If data points derived from a particular signal have phase differences in small neighborhoods of corresponding peaks, the modulo time indices associated with these data points may be used to estimate the starting and stopping times of the signal.

Diagram 220 shows phase difference histograms for phase differences between the phase values of mixture $x_1$ and mixture $x_2$, that is, $w_{x2}-w_{x1}$, for each of the sources. Diagram 224 shows phase difference histograms for phase differences between the phase values of mixture $x_1$ and mixture $x_3$, that is, $w_{x3}-w_{x1}$, for each of the sources. For each histogram, the x-axis represents the phase-difference, measured from −180 degrees to +180 degrees, and the y-axis represents the quantity of data points.

Referring back to FIG. 3, steps 118 through 140 may be performed using window numbers. According to one embodiment, the data points are represented in the frequency domain, so the modulo time indices are based on fast Fourier transform (FFT) window numbers. If the FFT window size is $w_s$, then there are $T/w_s$ windows for duration T, and each time slot $T_s$ has $S_w=T_s/w_s$ windows.

Figure 6:
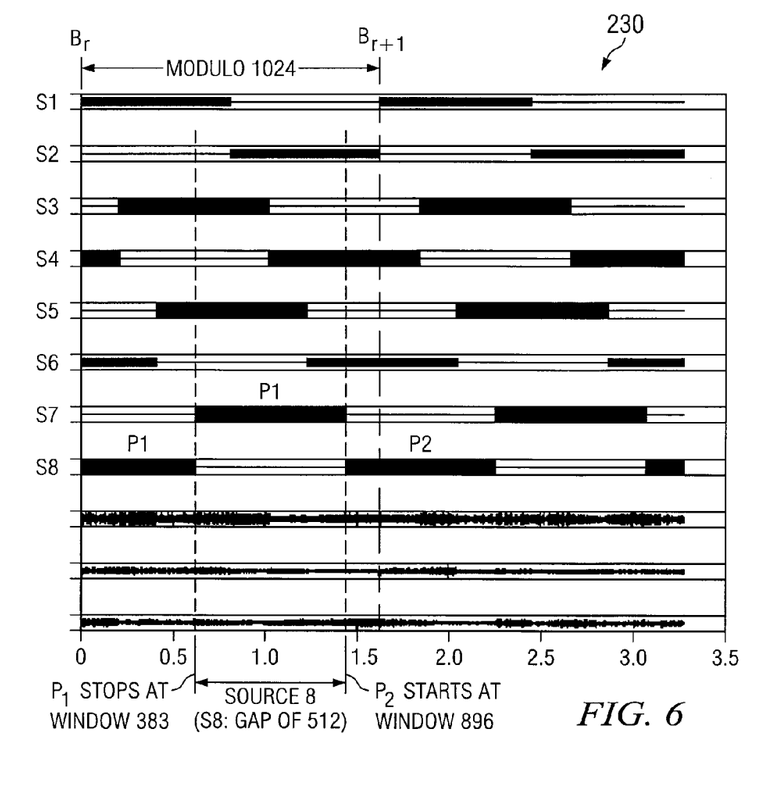
FIG. 6 includes a diagram illustrating example fast Fourier transform (FFT) windows.

FIG. 6 includes a diagram 230 illustrating example FFT windows. For a given FFT window, if any of the Fourier coefficients is in small neighborhoods of phase differences peaks of a particular signal, the entire FFT window is considered as derived from the particular signal as far as the modulo time index is concerned. In the example, reference frame boundaries $B_r$ of a reference frame of an array are separated by a modulo of 1024, and $S_w=512$.

Referring back to FIG. 3, each source is classified as an odd or even source at step 118. An odd source has a slot that starts and ends within a reference frame, and an even source has a slot that ends and then starts again within the reference frame.

Referring back to FIG. 6, diagram 230 illustrates example odd and even sources. According to diagram 230, source $s_7$ has a piece $P_1$ representing a slot that starts and ends within a reference frame, so source $s_7$ is an odd source. Source $s_8$ has pieces $P_1$ and $P_2$ representing a slot that ends and then starts again within the reference frame, so source $s_8$ is an even source. The gap of 512 FFT windows is allocated to the other time slot. Sources $s_4$, $s_6$, $s_8$ are even, and sources $s_1$, $s_3$, $s_5$, $s_7$ and $s_2$ are odd.

Referring back to FIG. 3, a source may be classified as an odd or even source at step 118 in any suitable manner. According to one embodiment, if a source has modulo time indices corresponding to a slot that starts and ends within a reference frame, the source is odd. If a source has modulo time indices corresponding to a slot that ends and then starts again within the reference frame, the source is even.

If a source is classified as even, the method proceeds to step 122, where pieces $P_1$ and $P_2$ are identified. The $P_1$ stopping time and the $P_2$ starting time are located at step 126. The $P_1$ stopping time and the $P_2$ starting time may be located using the time gap $T_g$ between pieces $P_1$ and $P_2$. The time gap $T_g$ between pieces $P_1$ and $P_2$ is $T_g = S_w(L-1)$, where L represents the number of time slots, and $S_w$ represents the number of FFT windows per time slot.

Time gap $T_g$ provides a marker to locate the starting and stopping times for a given frame. When the difference between two consecutive modulo time indices is greater than time gap $T_g$, then these two modulo time indices are the starting and stopping times for that frame.

As an example, time gap $T_g$ may be 512, and two frames derived from signal $s_8$ may have the following modulo time indices:

Frame 1 FFT window modulo time indices:
  . . . 164, 182, 218, 227, 343, 905, 906, 975, 976, . . . .

Frame 2 FFT window modulo time indices:
  . . . , 342, 359, 364, 368, 936, 972, . . . .

For Frame 1, the difference between underlined pair (343, 905) is 562>512. Thus, Frame 1 stops at window 343 and starts at window 905. For Frame 2, the difference between underlined pair (368, 936) is 568>512. Thus Frame 2 stops at window 368 and starts at window 936. The maximum and minimum values of the starting and stopping times of the frames may provide starting and stopping times, respectively, for a signal during duration T.

Figure 7A:
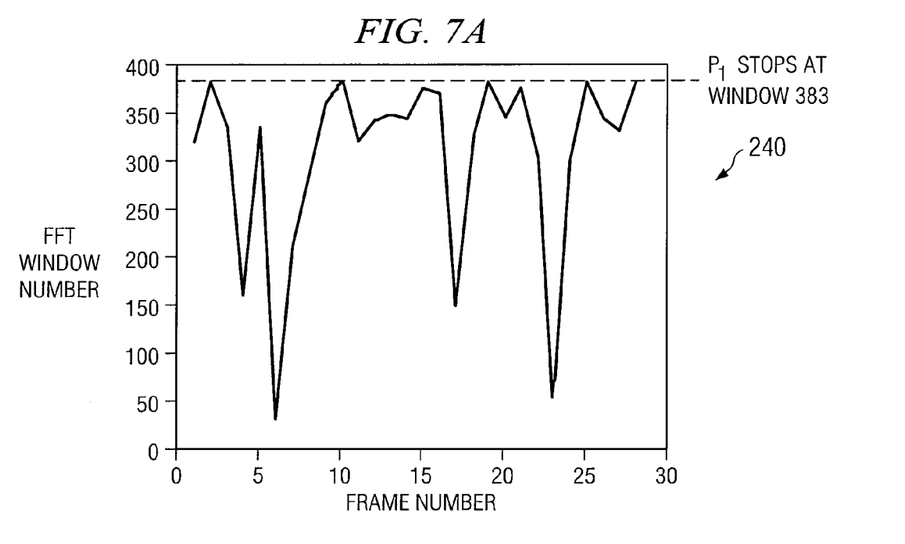
FIGS. 7A and 7B include graphs illustrating example maximum and minimum values of example starting and stopping times for an even source.
Figure 7B:
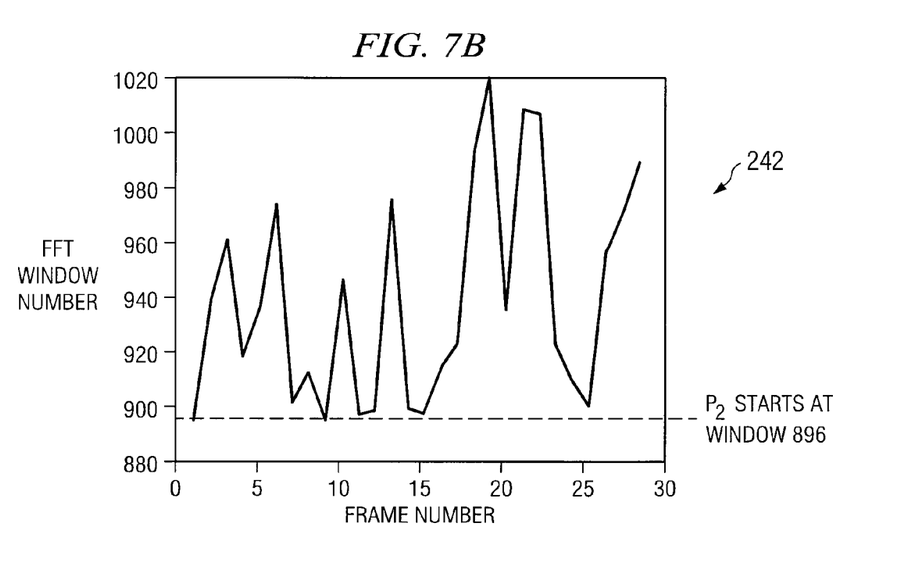

FIGS. 7A and 7B include graphs illustrating example maximum and minimum values of example starting and stopping times for an even source. Each graph plots starting and stopping times for each cell frame versus the frame number for the frame. FIG. 7A is a graph 240 that plots stopping times of signal $s_8$. The maximum value at window 383 may be designated as the stopping time for duration T. FIG. 7B is a graph 242 that plots starting times of signal $s_8$. The minimum value at window 896 may be designated as the starting time for duration T.

Figure 8:
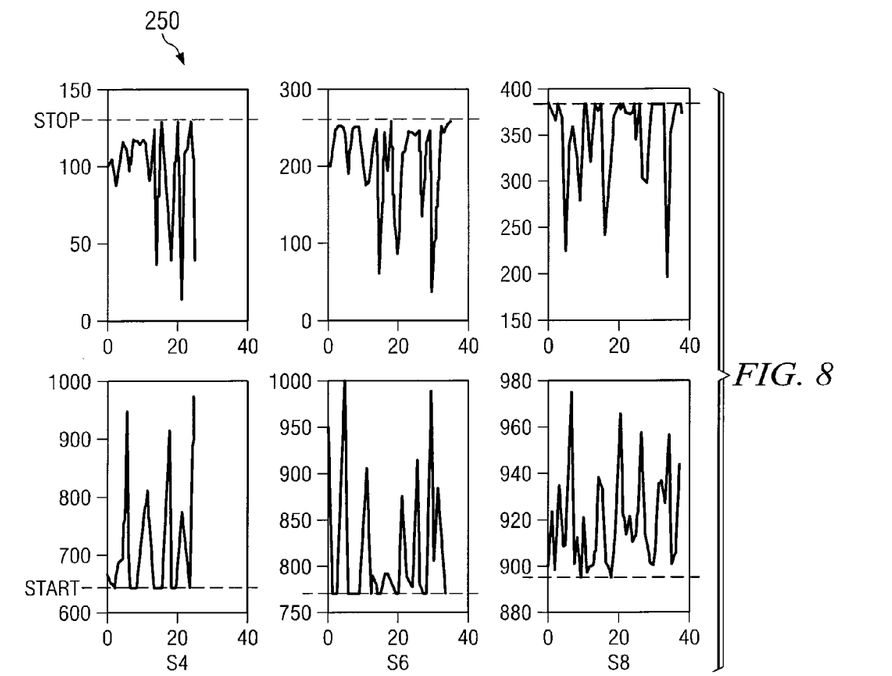
FIG. 8 includes graphs illustrating example maximum and minimum values of example starting and stopping times for other even sources.

FIG. 8 includes graphs 250 of example maximum and minimum values of example starting and stopping times for other even sources.

Referring back to FIG. 3, if a source is classified as odd, the method proceeds to step 132, where piece $P_1$ is identified. The $P_1$ starting and stopping times are located at step 136. The $P_1$ starting and stopping times may be located in any suitable manner. Since there is only one piece $P_1$ within a reference frame for a given signal, the starting time is just the minimum value during duration T, and the stopping time is the maximum value during duration T. According to one embodiment, noisy extreme outliers may be removed.

Figure 9:
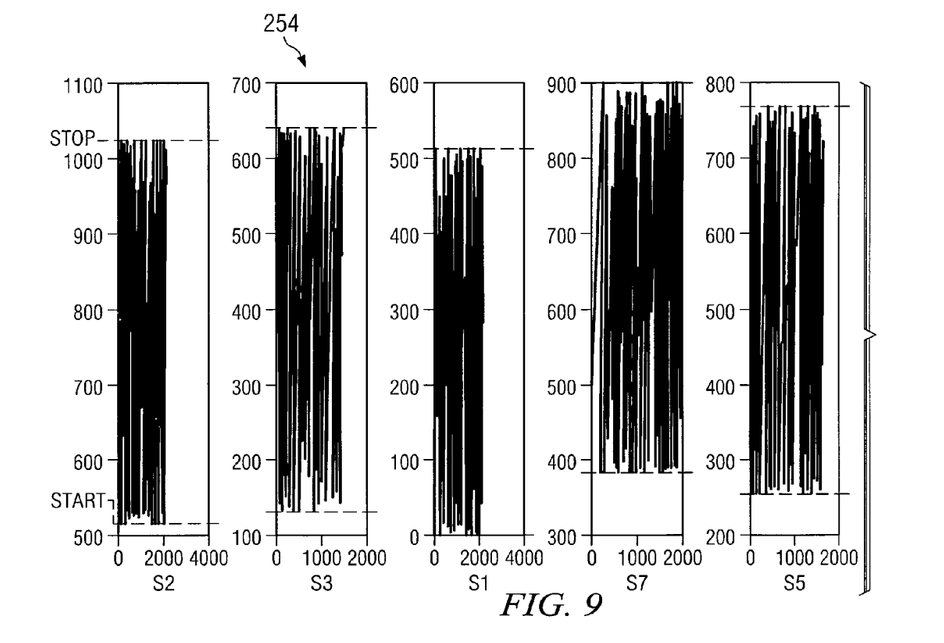
FIG. 9 includes graphs illustrating example maximum and minimum values of example starting and stopping times for odd sources.

FIG. 9 includes graphs 254 of example maximum and minimum values of example starting and stopping times for odd sources.

Referring back to FIG. 3, the cell frame boundaries are estimated from the starting and stopping times at step 140. The number of cells is estimated at step 144. The number of cells may be estimated in any suitable manner.

Figure 10:
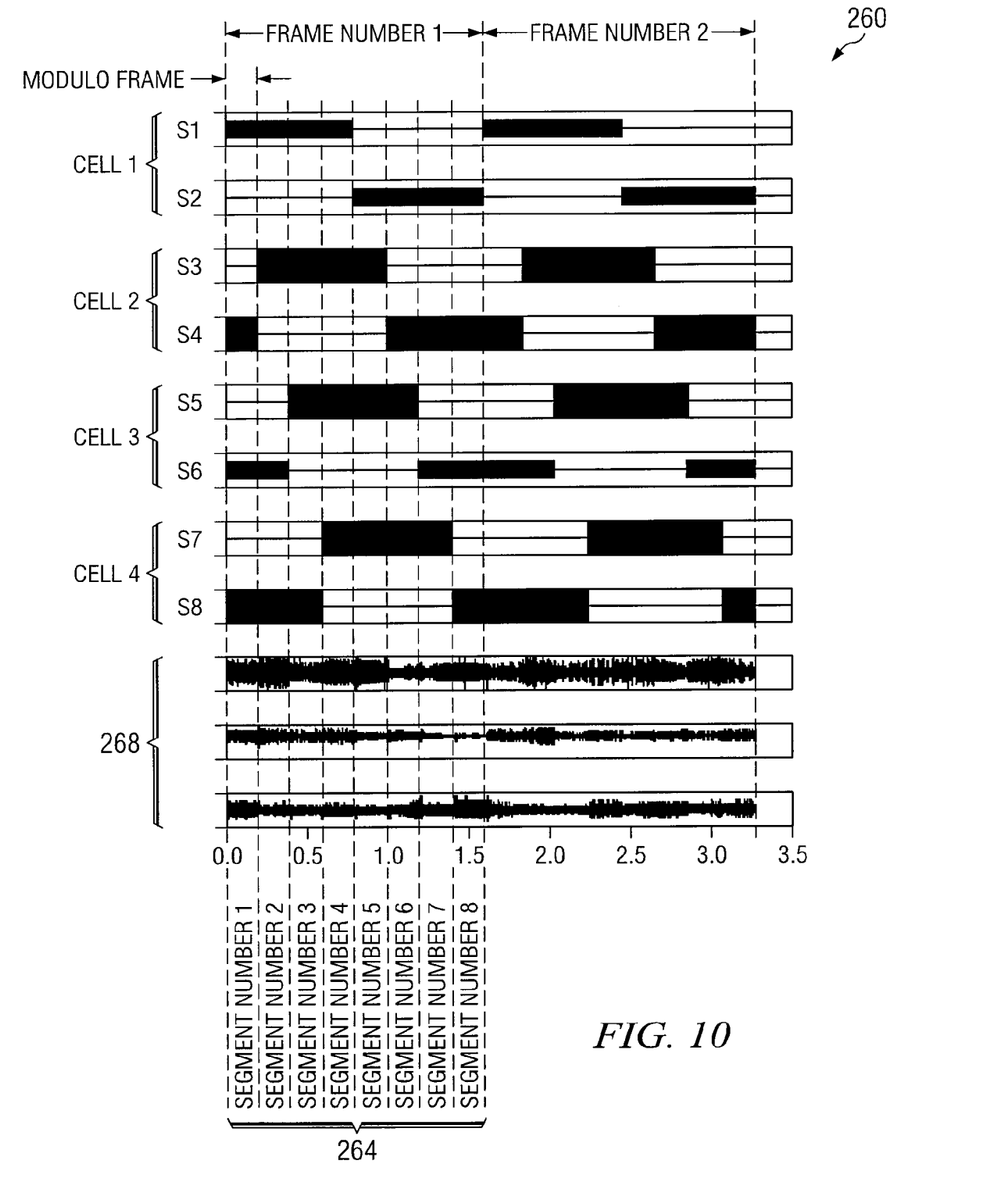
FIG. 10 includes a diagram illustrating an example technique for estimating the number of cells associated with received mixed signals.

FIG. 10 includes a diagram 260 illustrating an example technique for estimating the number of cells associated with received mixed signals. According to the example, segments 264 are designated. A segment 264 may refer to an interval between transition times. A transition time may refer to a time at which a slot of any of the signals starts or ends. According to the example, Frame 1 has eight segments 264. Mixtures 268 includes three mixtures with some combination of the various sources. In the example, the segments include the following sources:

| Seg. No. | Source No. |
|---|---|
| 1 | 1, 4, 6, 8 |
| 2 | 1, 3, 6, 8 |
| 3 | 1, 3, 5, 8 |
| 4 | 1, 3, 5, 7 |
| 5 | 2, 3, 5, 7 |
| 6 | 2, 4, 5, 7 |
| 7 | 2, 4, 6, 7 |
| 8 | 2, 4, 6, 8 |

Segments of the same modulo delays may be concatenated, and a magnitude clustering and phase difference technique may be applied to the concatenated segments to estimate the number of cells.

Figure 11A:
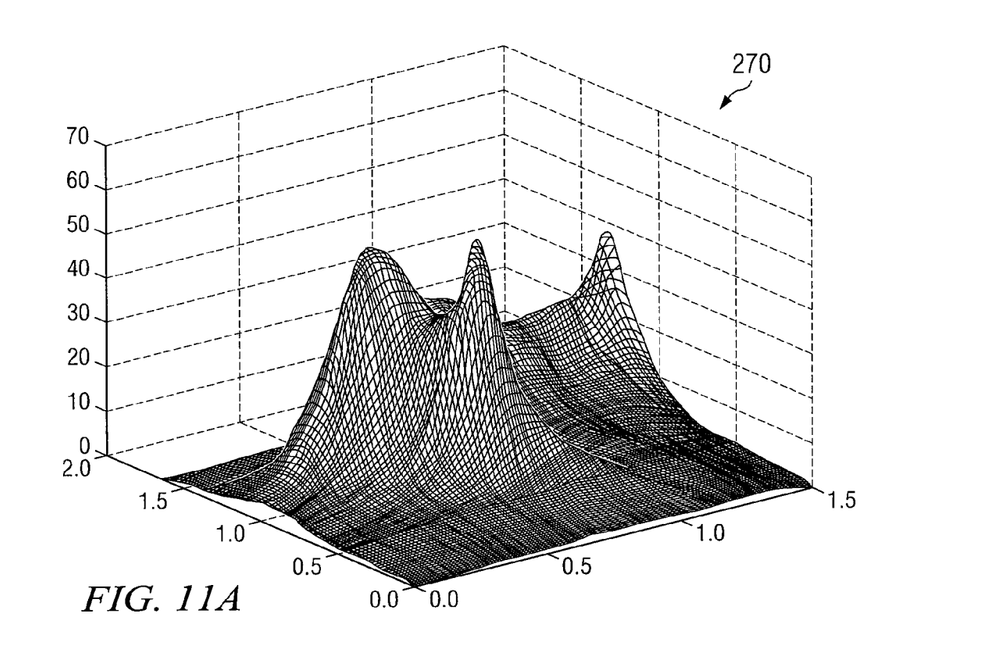
FIGS. 11A and 11B include diagrams illustrating the results of applying a magnitude clustering and phase difference technique.
Figure 11B:
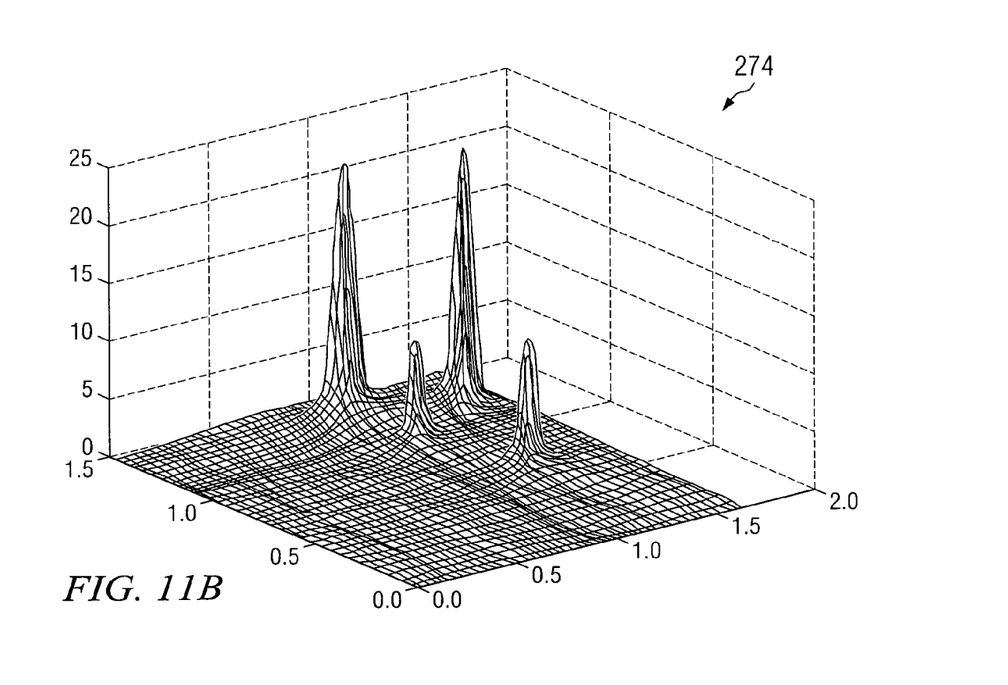

FIGS. 11A and 11B include diagrams 270 and 274 illustrating the results of a magnitude clustering and phase difference technique. Diagram 270 shows four peaks indicating that there are four cells, with one source signal per cell. Diagram 274 shows the four peaks after a sharpening process.

Referring back to FIG. 3, the number of cells may be used to simplify the source separation method. By allowing only one signal per cell, the search space for finding the shortest path that sparsely represents the signal may be limited. After estimating the number of cells, the method ends.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that the number of cells is estimated to separate mixed signals. The estimated number of cells may be used to limit the search space for finding the shortest path that sparsely represents a signal. Limiting the search space may allow for efficient signal separation. Another technical advantage of one embodiment may be that cell frame boundaries are established to estimate the number of cells. Establishing the cell frame boundaries may allow for effective cell number estimation.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for separating a plurality of mixed signals, comprising:
   receiving a plurality of mixed signals from a plurality of signal sources transmitting from a number of cells, a signal source operable to transmit a source signal, a mixed signal comprising at least a subset of the plurality of source signals;
   establishing a complex mixing matrix from the plurality of mixed signals, the complex mixing matrix describing mixing the plurality of the source signals to yield the plurality of the mixed signals;
   estimating the number of cells from the plurality of mixed signals; and
   separating the plurality of mixed signals using the complex mixing matrix and the estimated number of cells.

2. The method of claim 1, wherein receiving the plurality of mixed signals from the plurality of signal sources transmitting from the number of cells further comprises:
   receiving the plurality of mixed signals at an antenna array comprising a number of antenna elements, the number of the plurality of source signals greater than the number of antenna elements.

3. The method of claim 1, wherein receiving the plurality of mixed signals from the plurality of signal sources transmitting from the number of cells further comprises:
   receiving the plurality of mixed signals at an antenna array comprising a number of antenna elements, the number of cells greater than the number of antenna elements.

4. The method of claim 1, wherein separating the plurality of mixed signals using the complex mixing matrix and the estimated number of cells further comprises:
   allowing one source signal per cell for each of the number of cells.

5. The method of claim 1, wherein estimating the number of cells from the plurality of mixed signals further comprises:
   establishing a plurality of cell frame boundaries, a cell frame boundary of the plurality of cell frame boundaries associated with a cell of the number of cells; and
   estimating the number of cells in accordance with the plurality of cell frame boundaries.

6. The method of claim 1, wherein estimating the number of cells from the plurality of mixed signals further comprises:
   establishing a plurality of starting times, a starting time corresponding to a slot of a cell of the number of cells;
   establishing a plurality of stopping times, a stopping time corresponding to a slot of a cell of the number of cells; and
   estimating the number of cells in accordance with the plurality of starting times and the plurality of stopping times.

7. The method of claim 1, wherein estimating the number of cells from the plurality of mixed signals further comprises:
   establishing a plurality of segments, a segment representing an interval between a plurality of transition times, a transition time referring to a time at which a slot of any of the plurality of source signals starts or ends; and
   concatenating one or more segments of the same modulo delays.

8. The method of claim 1, wherein estimating the number of cells from the plurality of mixed signals further comprises:
   estimating the number of cells according to a magnitude clustering and phase difference technique.

9. The method of claim 1, wherein estimating the number of cells from the plurality of mixed signals further comprises:
   establishing a plurality of segments, a segment representing an interval between a plurality of transition times, a transition time referring to a time at which a slot of any of the plurality of source signals starts or ends;
   concatenating one or more segments of the same modulo delays; and
   applying a magnitude clustering and phase difference technique to the concatenated segments to estimate the number of cells.

10. A system for separating a plurality of mixed signals, comprising:
    an antenna array operable to:
       receive a plurality of mixed signals from a plurality of signal sources transmitting from a number of cells, a signal source operable to transmit a source signal, a mixed signal comprising at least a subset of the plurality of source signals; and
    a signal processing system coupled to the antenna array and operable to:
       establish a complex mixing matrix from the plurality of mixed signals, the complex mixing matrix describing mixing the plurality of the source signals to yield the plurality of the mixed signals;
       estimate the number of cells from the plurality of mixed signals; and
       separate the plurality of mixed signals using the complex mixing matrix and the estimated number of cells.

11. The system of claim 10, wherein the antenna array comprises a number of antenna elements, the number of the plurality of source signals greater than the number of antenna elements.

12. The system of claim 10, wherein the antenna array comprises a number of antenna elements, the number of cells greater than the number of antenna elements.

13. The system of claim 10, the signal processing system further operable to separate the plurality of mixed signals using the complex mixing matrix and the estimated number of cells by:
    allowing one source signal per cell for each of the number of cells.

14. The system of claim 10, the signal processing system further operable to estimate the number of cells from the plurality of mixed signals by:
    establishing a plurality of cell frame boundaries, a cell frame boundary of the plurality of cell frame boundaries associated with a cell of the number of cells; and
    estimating the number of cells in accordance with the plurality of cell frame boundaries.

15. The system of claim 10, the signal processing system further operable to estimate the number of cells from the plurality of mixed signals by:
    establishing a plurality of starting times, a starting time corresponding to a slot of a cell of the number of cells;
    establishing a plurality of stopping times, a stopping time corresponding to a slot of a cell of the number of cells; and
    estimating the number of cells in accordance with the plurality of starting times and the plurality of stopping times.

16. The system of claim 10, the signal processing system further operable to estimate the number of cells from the plurality of mixed signals by:
    establishing a plurality of segments, a segment representing an interval between a plurality of transition times, a transition time referring to a time at which a slot of any of the plurality of source signals starts or ends; and
    concatenating one or more segments of the same modulo delays.

17. The system of claim 10, the signal processing system further operable to estimate the number of cells from the plurality of mixed signals by:
  estimating the number of cells according to a magnitude clustering and phase difference technique.

18. The system of claim 10, the signal processing system further operable to estimate the number of cells from the plurality of mixed signals by:
  establishing a plurality of segments, a segment representing an interval between a plurality of transition times, a transition time referring to a time at which a slot of any of the plurality of source signals starts or ends;
  concatenating one or more segments of the same modulo delays; and
  applying a magnitude clustering and phase difference technique to the concatenated segments to estimate the number of cells.

19. A system for separating a plurality of mixed signals, comprising:
  means for receiving a plurality of mixed signals from a plurality of signal sources transmitting from a number of cells, a signal source operable to transmit a source signal, a mixed signal comprising at least a subset of the plurality of source signals;
  means for establishing a complex mixing matrix from the plurality of mixed signals, the complex mixing matrix describing mixing the plurality of the source signals to yield the plurality of the mixed signals;
  means for estimating the number of cells from the plurality of mixed signals; and
  means for separating the plurality of mixed signals using the complex mixing matrix and the estimated number of cells.

20. A system for separating a plurality of mixed signals, comprising:
  an antenna array operable to:
    receive a plurality of mixed signals from a plurality of signal sources transmitting from a number of cells, a signal source operable to transmit a source signal, a mixed signal comprising at least a subset of the plurality of source signals, the antenna array comprising a number of antenna elements, the number of the plurality of source signals greater than the number of antenna elements, the number of cells greater than the number of antenna elements; and
  a signal processing system coupled to the antenna array and operable to:
    establish a complex mixing matrix from the plurality of mixed signals, the complex mixing matrix describing mixing the plurality of the source signals to yield the plurality of the mixed signals;
    estimate the number of cells from the plurality of mixed signals by:
      establishing a plurality of cell frame boundaries, a cell frame boundary of the plurality of cell frame boundaries associated with a cell of the number of cells, the plurality of cell frame boundaries established by:
        establishing a plurality of starting times, a starting time corresponding to a slot of a cell of the number of cells;
        establishing a plurality of stopping times, a stopping time corresponding to a slot of a cell of the number of cells; and
      estimating the number of cells in accordance with the plurality of cell frame boundaries, the number of cells estimated from the plurality of mixed signals by:
        establishing a plurality of segments, a segment representing an interval between a plurality of transition times, a transition time referring to a time at which a slot of any of the plurality of source signals starts or ends;
        concatenating one or more segments of the same modulo delays; and
        applying a magnitude clustering and phase difference technique to the concatenated segments to estimate the number of cells; and
    separate the plurality of mixed signals using the complex mixing matrix and the estimated number of cells by allowing one source signal per cell for each of the number of cells.

* * * * *